United States Patent [19]

Ko et al.

[11] Patent Number: 5,193,079
[45] Date of Patent: Mar. 9, 1993

[54] COMPACT DISK CHANGER

[75] Inventors: Moon-Bai Ko; Chai-Il Lee; Kwang-Lim Park, all of Seoul, Rep. of Korea

[73] Assignee: Inkel Corporation, Rep. of Korea

[21] Appl. No.: 758,982

[22] Filed: Sep. 9, 1991

[30] Foreign Application Priority Data

Dec. 29, 1990 [KR] Rep. of Korea .............. 90-21831[U]
Dec. 29, 1990 [KR] Rep. of Korea .............. 90-21832[U]
Dec. 29, 1990 [KR] Rep. of Korea .............. 90-21833[U]
Dec. 29, 1990 [KR] Rep. of Korea .............. 90-22534

[51] Int. Cl.$^5$ ............................................. G11B 17/22
[52] U.S. Cl. ..................................... 369/37; 369/75.1; 360/98.04; 360/98.06
[58] Field of Search .................... 369/37, 75.1, 75.2; 360/98.04, 98.06

[56] References Cited

U.S. PATENT DOCUMENTS 5,115,419 5/1992 Akiyama et al. .................... 369/37

Primary Examiner—David P. Porta
Assistant Examiner—Don Wong
Attorney, Agent, or Firm—Perman & Green

[57] ABSTRACT

Disclosed is a CD changer which comprises a rack formed on the bottom of a tray which has an outer end having a half-gear part by leaving a gear only on a half of the upper portion and a non-gear part flatted by removing the gear on the lower portion; a tray locking stopper formed on the bottom of the tray adjacent to the half-gear part of the rack; a pinion drum in which a first pinion and a second pinion is formed integrally, and a half-gear part and a non-gear part are formed on a part of the second pinion and a semicircular wall part formed on the upper portion of the second pinion for locking the tray in cooperation with the stopper; a CD double insertion preventing device composed a fixed plate for being fixed on the upper bottom of the housing of the CD changer and a rotating plate pivotably connected to the front part of the fixed plate; and a plurality of protrusion formed in a line on the lower surface of the CD loading roulette on the tray, for generating a CD selecting signal and a roulette stopping signal in cooperation with a single sensor.

4 Claims, 13 Drawing Sheets

COMPACT DISK CHANGER

BACKGROUND OF THE INVENTION

1. Field of the Invention

The present invention relates to a compact disk changer (hereinafter referred to as a "CD changer"), and more particularly to a front loading type CD changer which loads or replaces compact disks (hereinafter referred to as "CD") by drawing out a tray for loading five CDs from the housing of the CD changer.

2. Description of the Prior Art

Generally, in a front loading type CD changer which can load or replace CDs by drawing out forward a tray for loading a plurality of CDs, in order to feed the tray forward or backward, a bar-shaped rack is formed in the feeding direction on the bottom of the tray and a pinion driven by a motor and engaged with the rack is installed in the upper surface of the bottom of the housing of the CD changer. When the pinion rotates, the tray can be drawn out from the housing or retracted into the inside of the housing.

In such a CD changer, it is preferable that CDs as many as possible can be loaded or replaced at one time by maximally drawing out the tray. After CDs are loaded or replaced and the tray is retracted into the inside of the housing, it is essential that the tray is surely locked in the inside of the housing to prevent the tray from being drawn out inadvertently. Also, to reduce the number of parts and to simplify the structure, it is preferable that the locking means of the tray is integrated with the tray feeding pinion.

In the past, in a CD changer, it has been suggested that the tray locking means is integrated with the pinion for feeding the tray, but there was a problem in that the size of the pinion should be large according to such an integration. Also, when the retracting operation of the tray is completed by the rotation of the pinion, even if the tray is locked, it has a drawback in that the locking state is easily released when the tray is inadvertently pulled out since the pinion continues to be engaged with the rack on the bottom of the tray.

To solve such drawbacks, it has also been suggested that after the retracting movement of the tray is completed by the rotation of the pinion, the pinion is moved apart from the rack on the bottom of the tray, and then the tray is locked by the locking means on the pinion. However, in this case, an extra pinion-rack separation means is needed, resulting in that the number of parts is increased and the device becomes complicated.

Accordingly, another method for locking the tray by the locking means on the pinion without separating the pinion from the rack has been suggested. In this method, a part of a single pinion is cut off to form a non-gear part. When the retracting movement of the tray is completed by the rotation of the pinion and the tray is locked by the locking means on the pinion, the non-gear part is faced toward the rack to keep the separation state of the pinion and the rack. However, in this case, since the number of teeth except the non-gear part of the single pinion should be as many as that of teeth of the rack, there also arise a problem of being large-sized of the pinion.

As described above, if the pinion becomes large, the CD changer cannot be compact. Accordingly, the diameter of the pinion should be small to make the CD changer be small-sized, and the pinion for feeding the tray forward and backward and the tray locking means should be separately installed to make the diameter of the pinion be small. In the past, there was a CD changer having the aforementioned structure, in which a tray locking pin strained by a coil spring is separately installed. However, in this case, the spring is weakened after it is used for a long time, and also the locking state is not firm, so that the tray can be inadvertently drawn out during the play of a CD. In addition, when the tray is drawn out to replace CDs, the spring acts as a load, so that there was a problem in that the operation for drawing out the tray is not smoothly carried out.

Meanwhile, in a front loading type CD changer which replaces CDs by drawing out a tray loaded with a plurality of CDs from the housing, when CDs are replaced during the play of a CD, it is preferable that a new CD may not be inadvertently inserted into the CD receiving part on the tray where the CD being in play has been loaded, so that the collision between the new CD and the CD being in play can be prevented. To do this, in the past, a CD double insertion preventing means has been suggested, in which a CD protecting cover for covering a CD receiving part on the tray where the CD being in play has been loaded is move forward and backward along the linear guide slot formed on the upper inner surface of the housing. When the tray is drawn out, the rear end of the CD protecting cover is pushed out of the housing by the rear wall of the tray and covers the above CD receiving part, and when the tray is retracted, the front end of the CD protecting cover is pushed into the housing by the front wall of the tray. However, there should be a sufficient distance between the CD protecting cover and the upper surface of the tray to move such a CD protecting cover forward and backward without touching CDs, and consequently the heights of the front and rear wall of the tray should be sufficiently higher than that of the upper surface of the tray. As a result, the size of the tray becomes large, and even so, when the CD protecting cover generally manufactured from plastic is deformed by some reasons, it may touch the CD on the tray.

Further, in a conventional CD changer, a means for selecting a specific CD which will be played has been suggested, in which one to plural holes corresponding to the order of CDs are formed in the rotational roulette for loading a plurality of CDs on the tray, an optical signal scanning and sensing device is disposed on the lower side of the roulette, and a reflector is disposed on the upper side of the roulette, so that the position of the specific CD to be selected on the roulette is identified by a reflected optical signal passed through the one to plural holes. The means can exactly identify the position of the specific CD, but since, to stop the rotating operation of the roulette, an extra stopping signal generating structure should be formed on the bottom of the roulette and also an extra sensor for sensing the stopping signal should be installed. Accordingly, a plurality of sensors are necessary and the signal detecting circuit becomes complicated.

There has been another CD selecting means which comprises two circular protruded walls formed on the bottom of the roulette, i.e., a circular protruded wall for generating a signal for identifying five CDs and another for generating a signal for stopping the rotation of the roulette in aligning the position of the selected CD among the five CDs with the pickup. These walls are passed through separated sensors to select a specific CD and to stop the rotation of the roulette. Therefore, in this case, a plurality of sensors are also necessary and the signal detecting circuit becomes complicated.

OBJECTS OF THE INVENTION

It is an object of the present invention to provide a new tray feeding and locking means, in which a tray feeding pinion is integrated with a tray locking means while the size of the pinion being small, so that the tray can maximally be drawn out from the housing to replace all the five CDs, and that when the tray is retracted inside the housing of the CD changer to be in a playable state, it surely locks the tray inside the housing with the tray not being drawn out inadvertently.

It is another object of the present invention to provide a new means for effectively preventing a new CD from being inserted during the replacement of CDs without making the tray be large.

It is a further object of the present invention to provide a new means for generating a signal for selecting a desired CD among CDs on a roulette and concurrently a signal for stopping a roulette at the position of the selected CD by a single sensor during the play of CD.

SUMMARY OF THE INVENTION

In a preferred embodiment of the present invention, there are provided a straight bar-shaped rack formed on the bottom of the tray in the feeding direction and having the outer end with a half-gear part being formed by leaving a series of teeth only on the upper half part thereof and a flat non-gear part being formed by removing the gear on the lower half part thereof, a stopper for locking the tray formed on the lower surface of the tray adjacent to the half-gear part of the rack, and a pinion drum placed on the upper surface of the bottom of the housing and driven by a motor, the pinion drum having a half-gear part and a non-gear part to feed the tray forward and backward by being engaged with the rack, and a semicircular wall part for locking the tray in cooperation with the stopper;

a CD double insertion preventing device which is placed on the bottom of the upper part of the housing of the CD changer and is pivoted around an axis by being engaged with an extruded pin provided on the rear part of the tray when the tray is drawn out during the replacement of CDs, covers a CD insertion portion, where a CD in play has been loaded, among five CD inserting portions of the roulette for loading CDs on the tray when the tray is fully drawn out forward, and accordingly prevents a new CD from being inserted at that place; and five groups of protrusions which are disposed in a predetermined order in a ring-shaped line on the lower surface of the roulette for loading CDs on the tray and which generates a CD selecting signal and a roulette stopping signal, corresponding to each of the five CD inserting portions, in cooperation with a single optical signal scanning and sensing device.

BRIEF DESCRIPTION OF THE DRAWINGS

The above objects and other advantages of the present invention will become more apparent by describing the preferred embodiment of the present invention with reference to the attached drawings, in which.

DETAILED DESCRIPTION OF THE INVENTION

In a preferred embodiment, the CD changer of the present invention comprises a tray feeding and locking means for drawing out or retracting the tray and locking the tray when it is retracted and is in a playable state, a means for preventing the CD from being inserted into the CD inserting portion on the roulette where a CD in play is loaded, and a means for selecting a desired CD among five CDs on the roulette and stopping the roulette.

Figure 1:
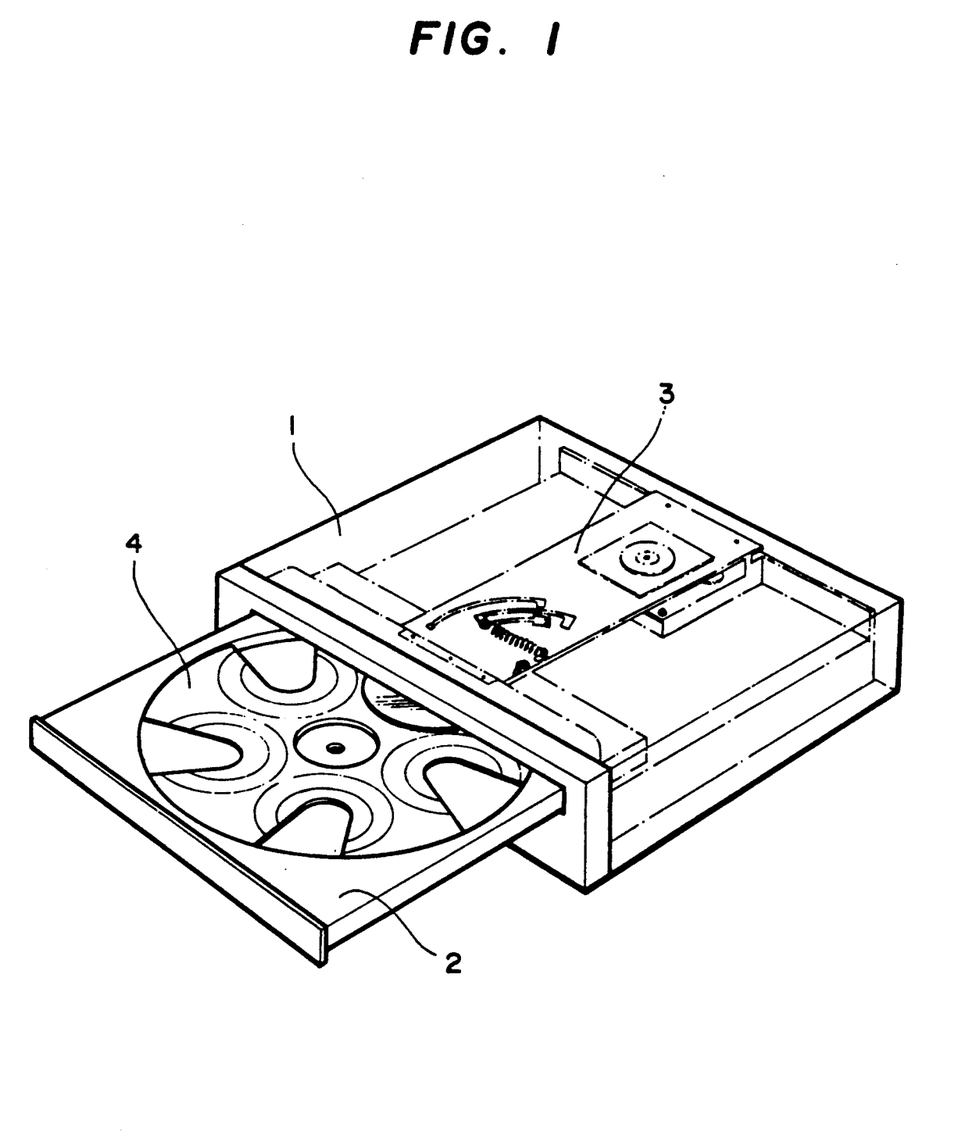
FIG. 1 is a perspective view which shows that the tray is drawn out into the CD replacing position in the CD changer according to the present invention.

FIG. 1 is a schematic perspective view showing that the CDs can be loaded or replaced by drawing out the tray 2 from the housing 1 in the CD changer of the present invention.

A CD double insertion preventing device 3 is installed in the feeding direction of the tray on the upper inner surface of the housing 1 as shown in the phantom line and a roulette 4 provided with five CD inserting portions is installed to be able to rotate at the center of the upper part of the tray 2.

Figure 2:
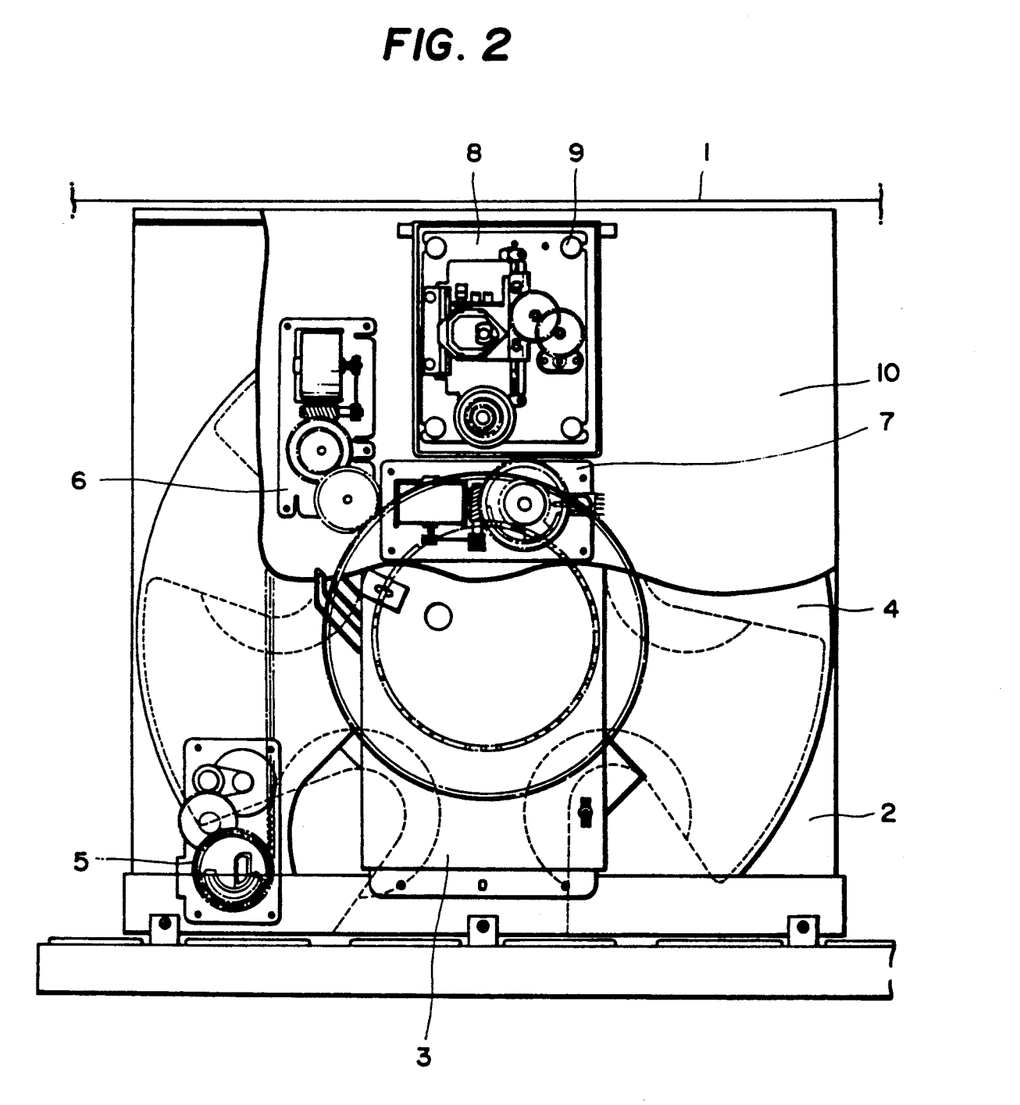
FIG. 2 is a partially cutaway plan view showing the inside structure of the CD changer according to the present invention.

FIG. 2 is a partially cutaway plan view of the present invention, in which a pinion drum 5 for feeding and locking the tray 2, a roulette rotation driving device 6, a drive unit lifting device 7, and a drive unit 8 are disposed inside the housing 1. Shock absorbers 9 for absorbing the vibration or the shock are installed in the four corners of the drive unit 8.

Hereinafter, the constitution and the operation of the present invention with be described in detail with reference to FIGS. 3 through 9.

Figure 3:
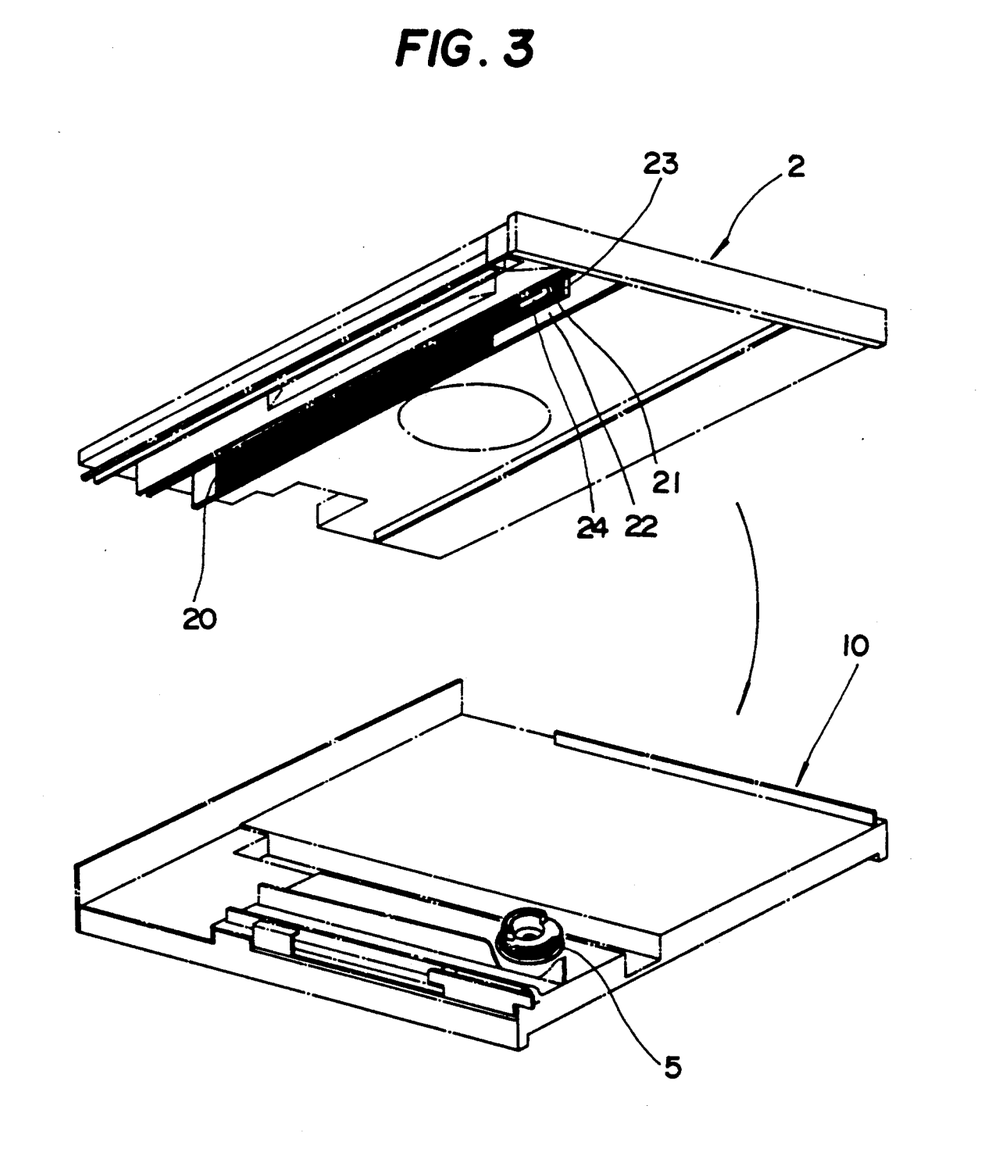
FIG. 3 is a perspective view of the essential part which shows the structure of the lower surface of the tray and the structure of the lower surface of the housing.

FIG. 3 is a disassembled perspective view showing the structure of the lower surface of the tray 2 and the structure of the inside of the housing bottom 10 according to the present invention. The straight bar-shaped rack 20 is formed in the feeding direction of the tray on the lower surface of the tray 2, and at the outside end portion of the rack 20, a half-gear part 21 is formed by leaving the gear only on the upper part and a non-gear part 22 is formed by flatting the lower portion. Here, an outmost single sawtooth 23 disposed at the outmost of the half-gear part 21 is a little bit larger than the other sawteeth. The stopper 24 for locking the tray 2 when the tray 2 is completely retracted, is formed on the lower surface of the tray 2 adjacent to the half-gear part 21 and the non-gear part 22.

The pinion drum 5 for feeding and locking the tray driven by the conventional motor (as shown in FIG. 2) is disposed on the inner surface of the housing bottom 10, in which the pinion drum 5 feeds the tray 2 forward and backward in cooperation with the rack 20 and locks the tray 2 in cooperation with the stopper 24, so that the tray 2 is not inadvertently drawn out when the tray 2 is completely retracted inside the housing.

Figure 4:
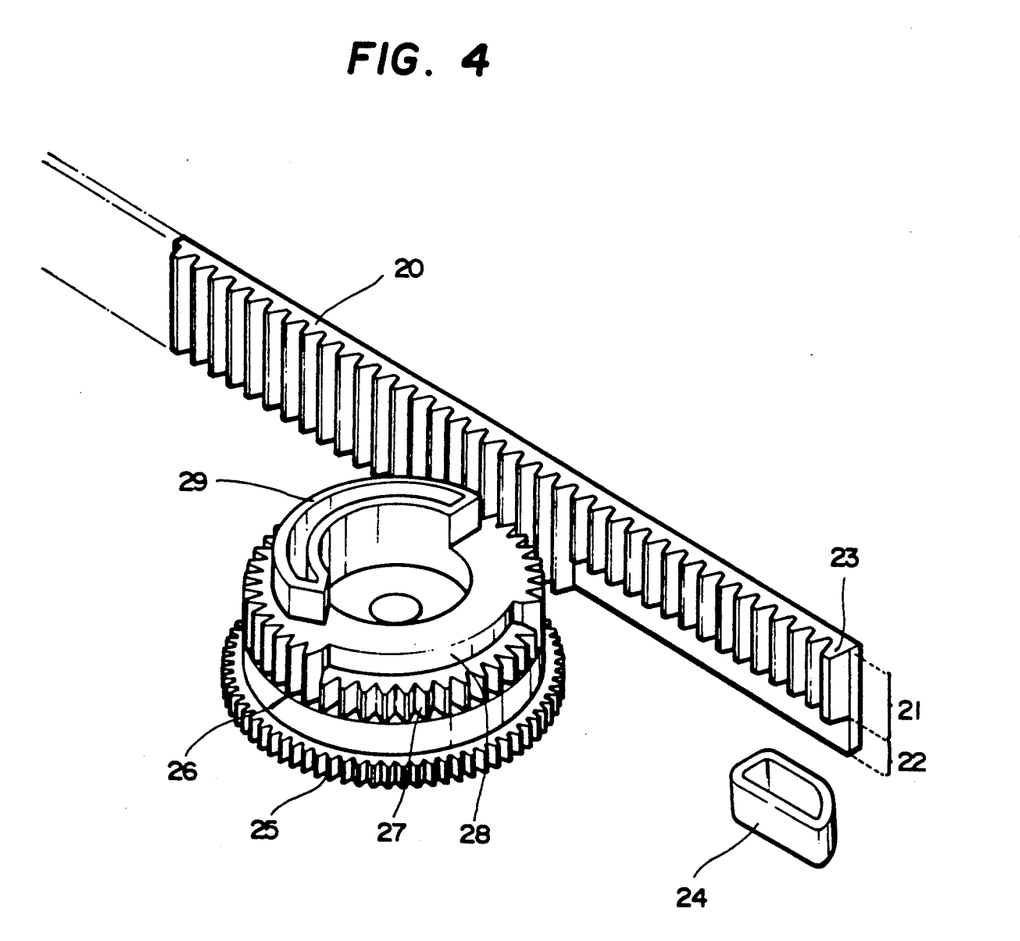
FIG. 4 is a partially enlarged perspective view which shows that the rack and the tray stopper are formed on the bottom of the tray shown in FIG. 3 and that the pinion drum formed on the bottom of the housing is engaged with the rack.

FIG. 4 is a partially enlarged perspective view showing that the rack 20 and the stopper 24 are disposed on the lower surface of the tray 2 and that the pinion drum 5 placed on the inner surface of the housing bottom 10, for feeding and locking the tray, is engaged with the rack 20. In this drawing, the tray 2 and the housing bottom 10 is omitted for clarification. The pinion drum 5 which is formed by uniting the two pinions having different diameters comprises a first pinion 25 driven by the power of a motor, and a second pinion 26 integrated on the upper part of the first pinion and having a smaller diameter than that of the first pinion.

The second pinion 26 is to be engaged with the sawteeth of the rack 20, having the half-gear part 27 formed by leaving the sawteeth only on the lower part on a part of the second pinion 26 and the smoothly curved non-gear part 28 formed by removing the sawteeth on the upper part. A semicircular wall part 29 having a smaller diameter than that of the second pinion 26 is formed on the upper part of the second pinion. The half-gear part 27 of the second pinion 26 is freely rotated by the non-gear part 22 of the rack 20 when the retracting operation of the tray 2 is completed. Also, when the retracting operation of the tray 2 is completed, the semicircular wall part 29 is engaged with the stopper 24 formed on the lower part of the tray 2, thereby locking the tray 2.

Figure 5A:
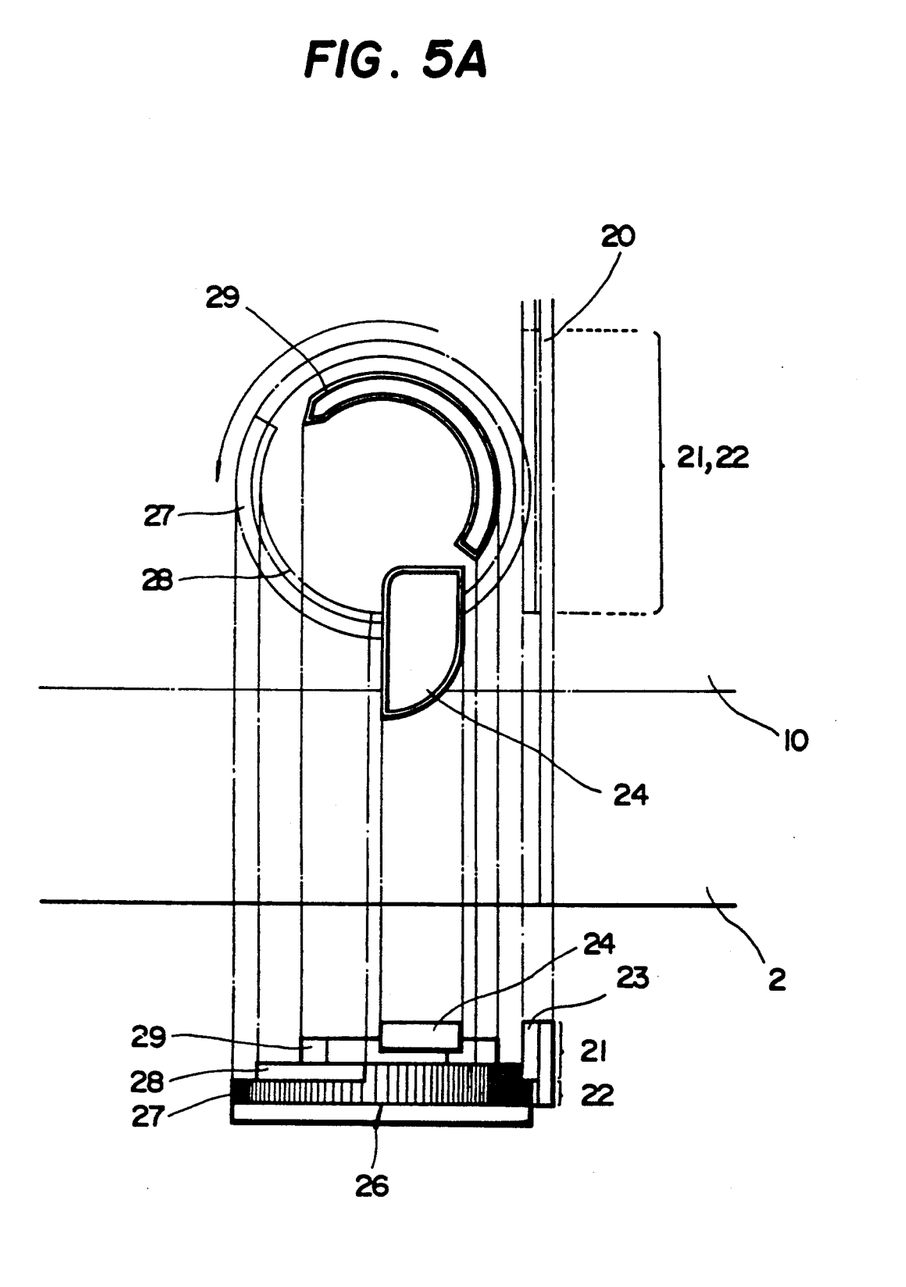
FIGS. 5A through 5C are schematic views showing that the rack being engaged with the pinion drum is retracted according to the rotation of the pinion drum when the tray is retracted, and that the stopper is retracted and is engaged with the semicircular wall part.
Figure 5B:
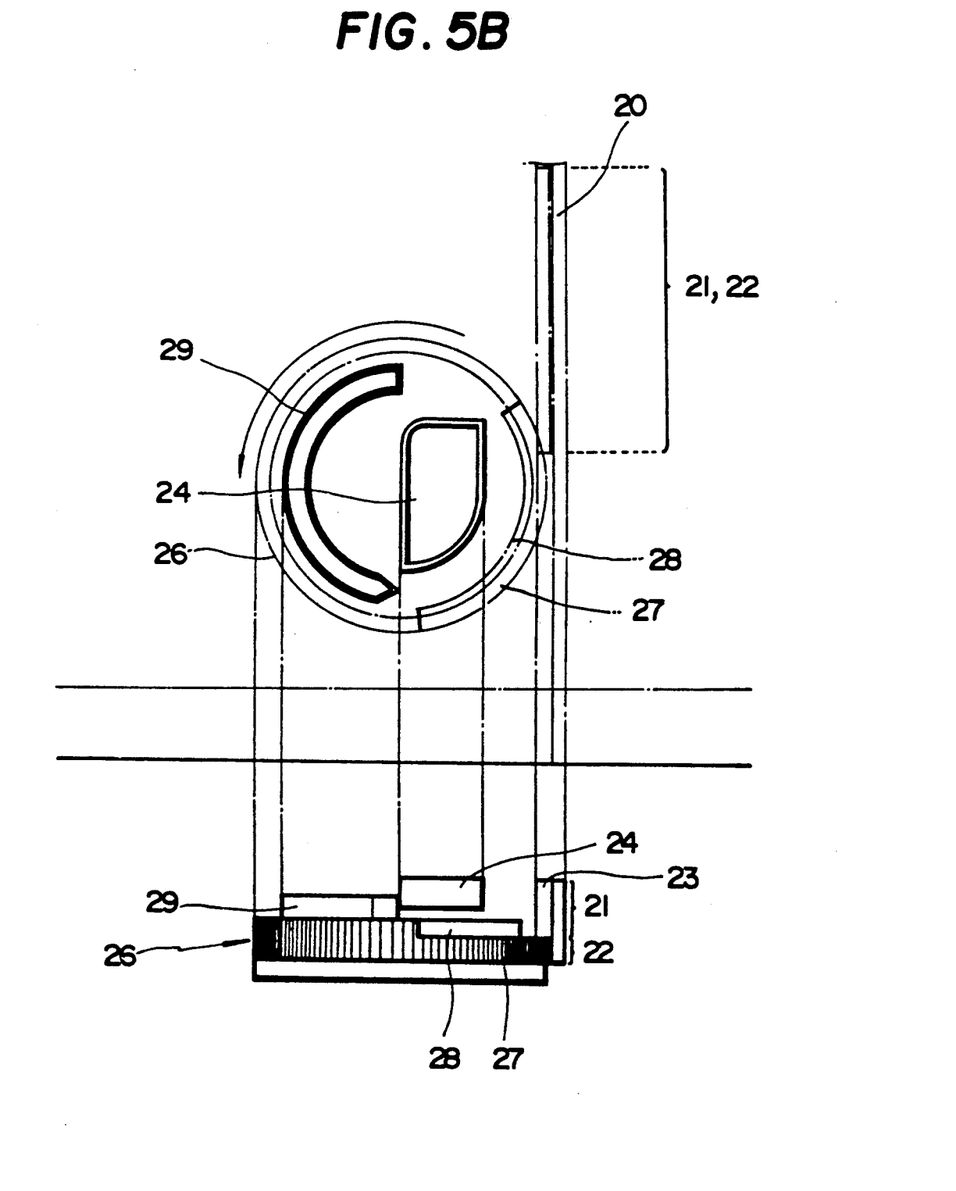
Figure 5C:
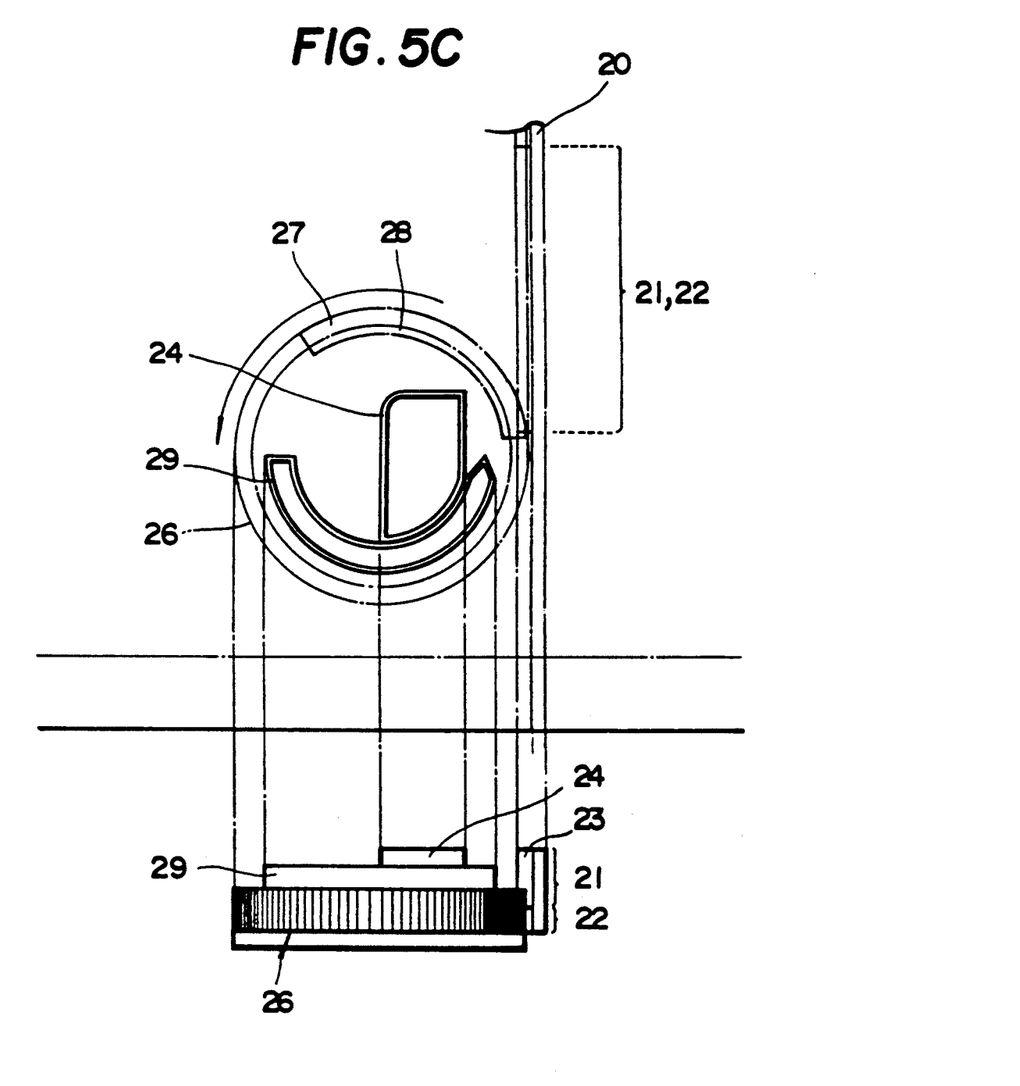

FIG. 5 is a schematic view showing in stages that during the retracting operation of the tray, the rack 20 being engaged with the pinion drum 5 is retracted backward and, at the same time the stopper 24 is retracted to be engaged with the semicircular wall part 29 formed on the upper part of the pinion drum 5.

Referring to FIG. 5A, the pinion drum 5 is rotated counterclockwise by the power of the motor (not shown) The second pinion 26 is engaged with the sawteeth of the rack 20 to feed the rack 20 backward. The tray 2 is in the almost retracted position. At this time, the stopper 24 is in the state of being entered to the inner wall of the semicircular wall part 29. In FIG. 5B, the pinion drum 5 is continuously rotated counterclockwise, so that the rack 20 is completely retracted and the stopper 24 fully enters inside the semicircular wall part 29 of the pinion drum 5. At this time, since the half-gear part 27 of the second pinion 26 passes through the region of the non-gear part 22 of the rack 20, the pinion drum 5 is continuously and freely rotated while the rack being in stop, so that the stopper 24 is locked in contact with the inner side of the semicircular wall part 29 as shown in FIG. 5C. Such a free rotation of the second pinion 26 is stopped in response to the stopping signal generated by the extra stopping means after the half-gear part 27 completely passes through the region of the non-gear part 22 of the rack 20 and just before the sawtooth of the second pinion 26 followed by the non-gear part 28 is engaged with the outmost sawtooth 23 which is formed a little bit larger than the other gears on the rack 20.

As described above, since the half-gear part 27 of the second pinion 26 is in the region of the non-gear part 22 of the rack 20 in the locking state after the retracting operation of the tray is completed, even if the tray is inadvertently drawn out, the sawteeth of the rack 20 are not engaged with those of the pinion drum 5. As a result, the pinion drum 5 is not rotated and keeps a stop state, so that the locking states of the stopper 24 and the semicircular wall part 29 are surely kept.

As described above, when the tray in the locking state is drawn out, the extra control switch is pressed to rotate the pinion drum 5 clockwise. Then, while the half-gear part 27 passes through the non-gear part 22 of the rack 20, the pinion drum 5 is freely rotated and releases the stopper 24 from the semicircular wall part 29. When the free rotation is finished, the first sawtooth after the non-gear part 28 of the second pinion is surely engaged with the outmost sawtooth 23 formed being larger than the other sawteeth of the rack 20, thereby drawing out the rack 20.

Figure 6:
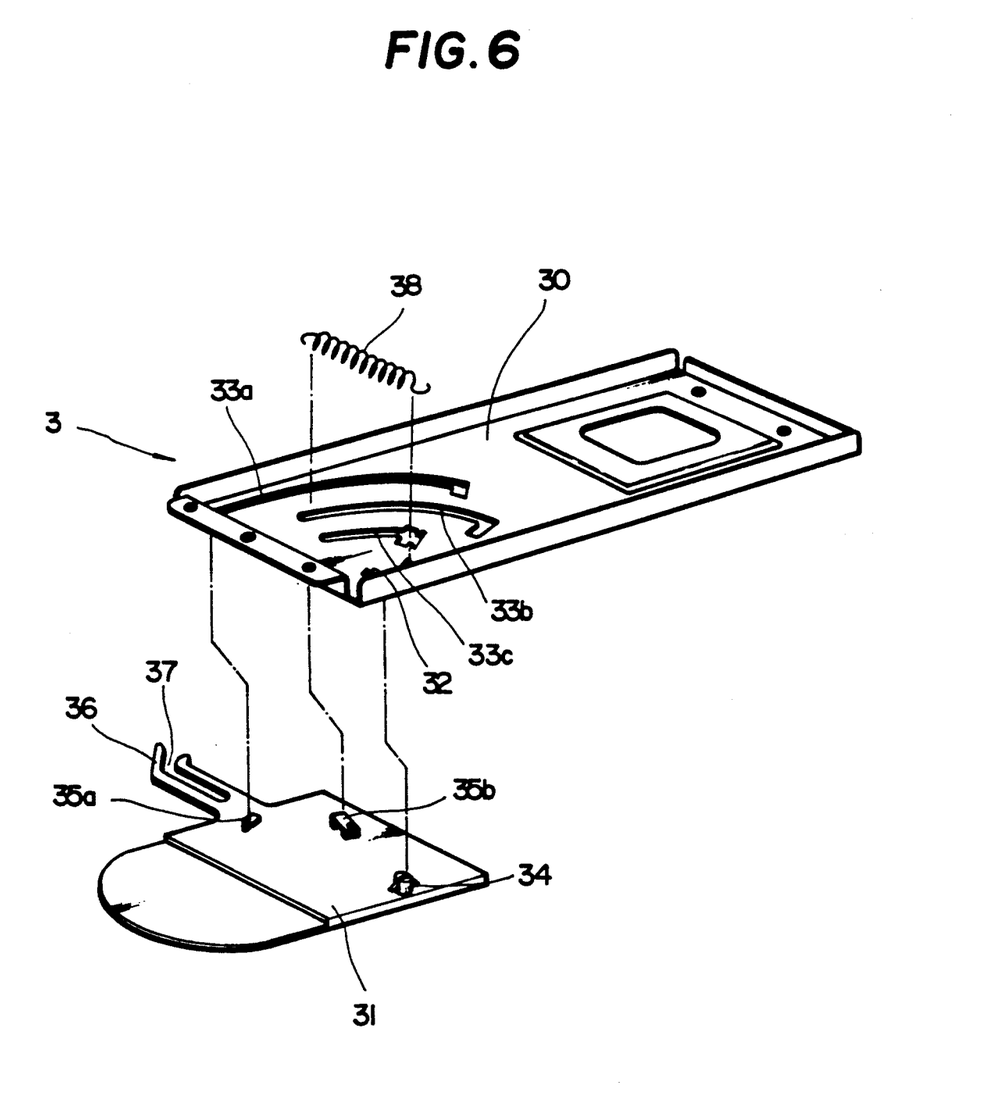
FIG. 6 is a disassembled perspective view of a CD double insertion preventing device.

FIG. 6 is a disassembled perspective view showing the detailed structure of the CD double insertion preventing device 3 installed on the upper bottom of the housing. The CD double insertion preventing device 3 consists of a fixed plate 30 attached to the upper inner surface of the housing and a rotating plate 31 pivotably connected to the fixed plate 30. A rotating axis inserting hole 32 of the rotating plate 31 and three arc-shaped guide slots 33a, 33b and 33c for being served as guide paths during the rotation of the rotating plate 31 are formed on the front part of the fixed plate 30.

Figure 7A:
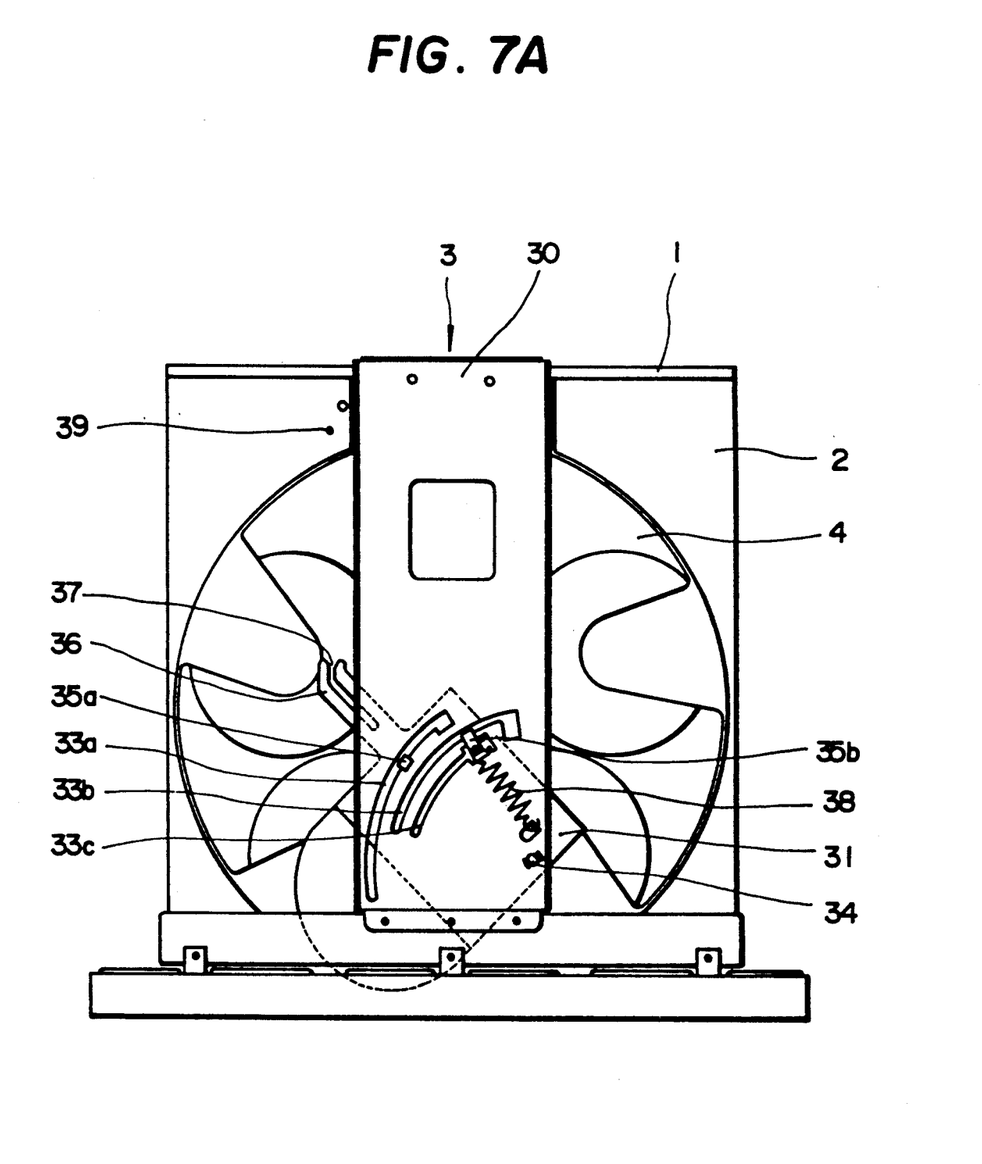
FIGS. 7A through 7C show schematic plan views showing that the CD double insertion preventing device is operated as the tray is drawn out from the housing.
Figure 7B:
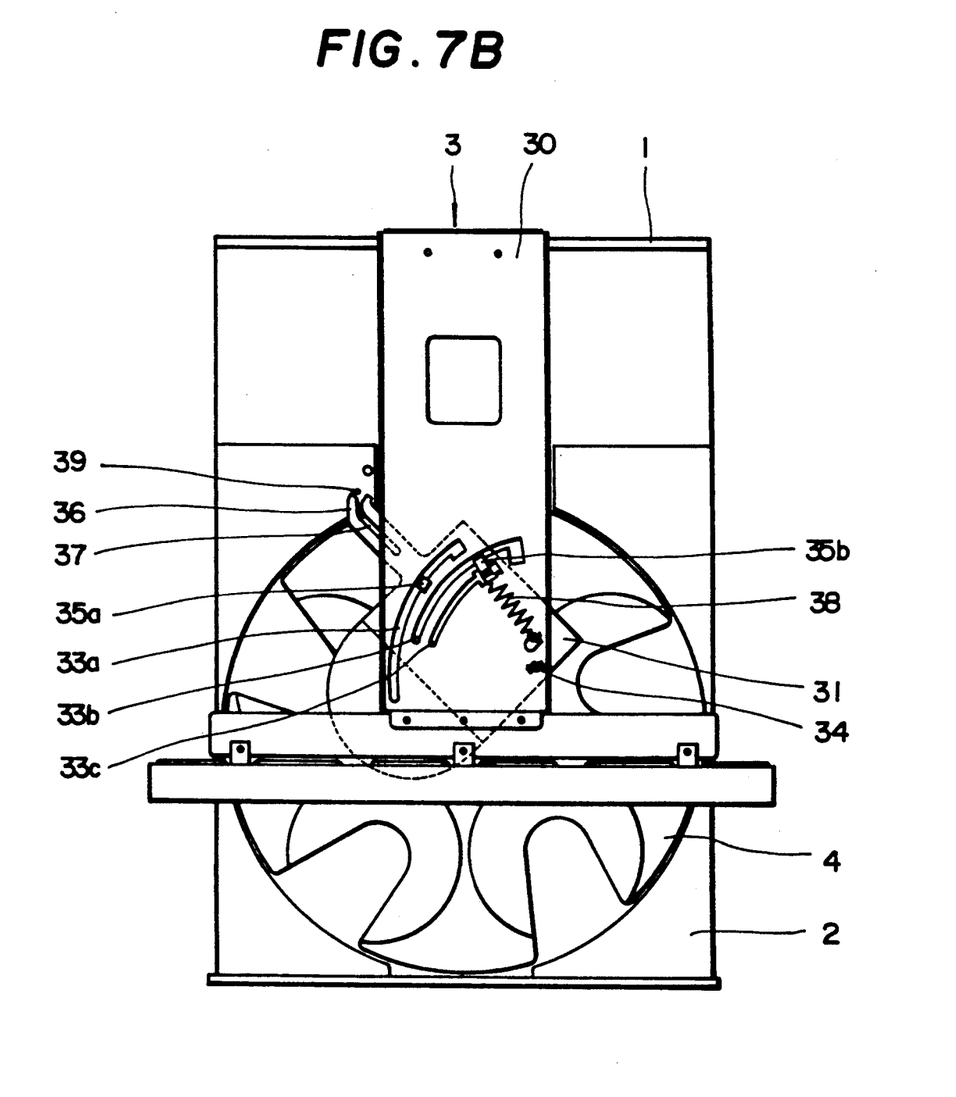
Figure 7C:
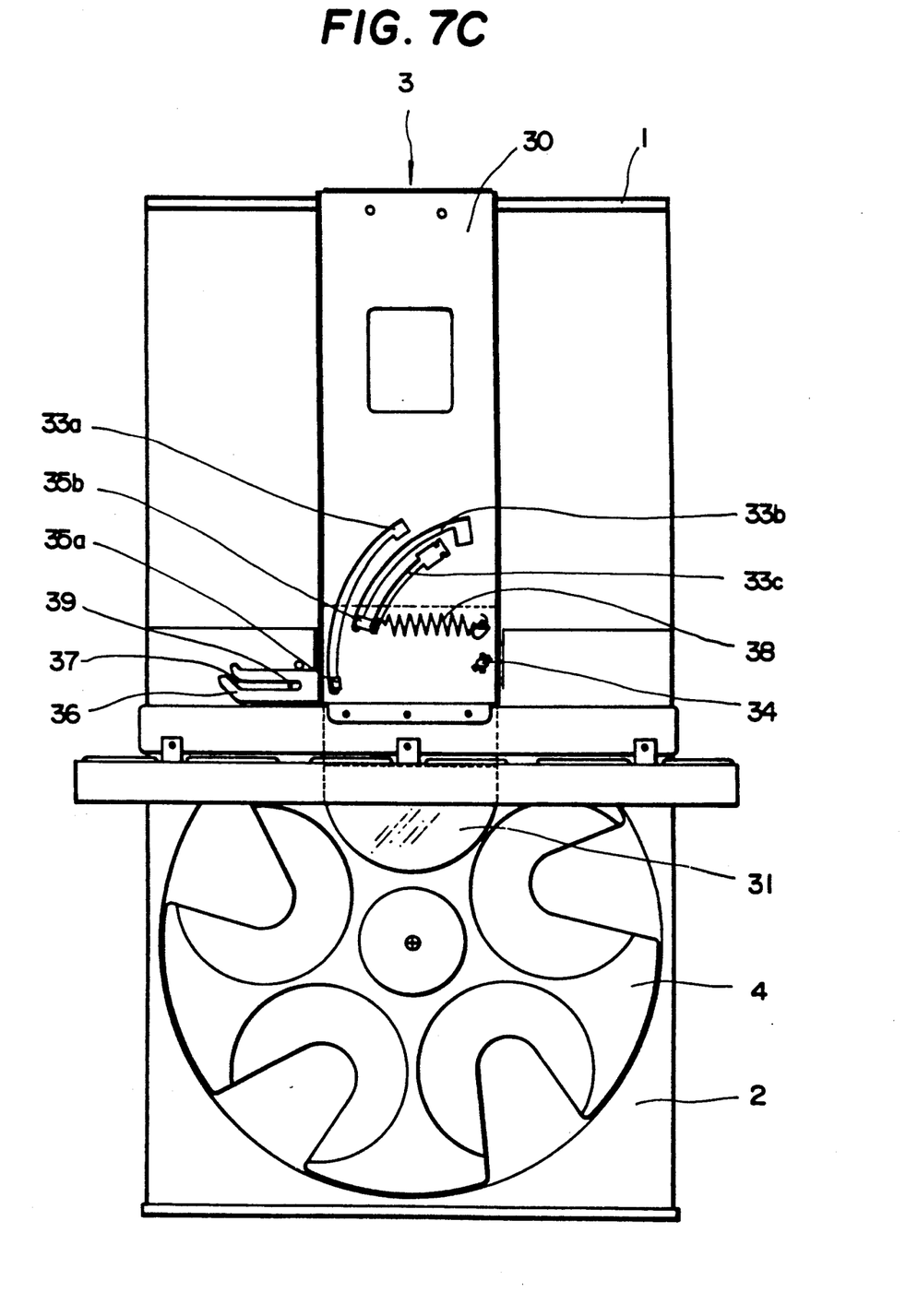

A semicircular cover having a little bit larger curvature than that of the CD is formed in the front part of the rotating plate 31, and the rotating axis 34 inserted into the rotating axis inserting hole 32 formed in the fixed plate 30, and the guide pieces 35a and 35b guided along the arc-shaped guide slots 33a, 33b, and 33c are formed on the upper surface of the rotating plate 31, a forked arm 36 is formed on the left side of the rotating plate 31 and the guide path 37 cooperating with the protruded pin 39 of the tray which will be described later with reference to FIG. 7, is provided between the two forks of the arm 36.

It is proper that the fixed plate 30 is generally made of a metal and the rotating plate 31 is made of synthetic resins (preferably, a semitransparent synthetic resins).

FIGS. 7A through 7C are perspective views showing how the CD double insertion preventing device 3 disposed on the upper bottom of the housing 1 is installed and that when the tray 2 is drawn out from the housing 1, the rotating plate 31 is rotated counterclockwise, so that the semicircular cover of the front part is protruded to the front direction to cover the CD inserting portion on the roulette where the CD being in play was loaded.

As described in FIG. 7A, the fixed plate 30 is fixed in the feeding direction of the tray 2 on the upper inner surface of the housing 1, and the rotating plate 31 can be rotated at the center of the rotating axis 34 and is connected to the fixed plate 30 having the guide pieces 35a and 35b guided along the arc-shaped guide slots 33a, 33b, and 33c of the fixed plate 30. An end of a coil spring 38 is connected to the guide piece 35b, and the other end of the spring 38 is connected to the fixed plate 30 at the position near to the rotating axis 34. The spring 38 pulls the rotating plate 31 clockwise, thereby acts to keep the rotating plate 31 the retracted state when the retracting operation of the tray 2 is completed. FIG. 7A shows that the tray 2 is fully retracted inside the housing 1. At this time, the rotating plate 31 of the CD double insertion preventing device 3 is kept as the retracted state by the operation of the spring 38.

As described in FIG. 7B, if the tray 2 is started to be drawn out forward by the clockwise rotation of the pinion drum 5 described with reference to FIGS. 3 through 5, the protruded pin 39 formed on the rear part of the tray 2 is moved to the forward to be entered to the guide path 37 of the forked arm 36. If the tray 2 is continuously moved forward, the protruded pin 39 is engaged with the guide path 37 to rotate the rotating plate 31 counterclockwise against the force of the spring 38, thereby protruding the semicircular cover formed on the front part of the rotating plate 31 to the outside of the housing 1. When the tray 2 is completely drawn out to the position for loading or replacing CDs, as shown in FIG. 7C, the semicircular cover covers the innermost CD inserting portion, where the CD being in play has been loaded, among five CD inserting portions on the roulette 4. As a result, when a CD is played, a new CD cannot be inserted into the CD inserting portion where the CD in play has been disposed, and only the other four CDs can be replaced. Meanwhile, when any CD is not played and the replacement is carried out, after the drawing operation of the tray 2 is completed, four CDs are first replaced. Then, the remaining one CD on the innermost CD inserting portion is replaced after the roulette is rotated by the distance for one disk by pressing the disk skip key (not shown), so that all of five CDs can be replaced. The disk skip key is not operated during the play of the CD, and even if it is pressed, the roulette 4 is not rotated, so that a new CD cannot be loaded into the CD receiving portion covered with the semicircular cover of the rotating plate 31.

Figure 8:
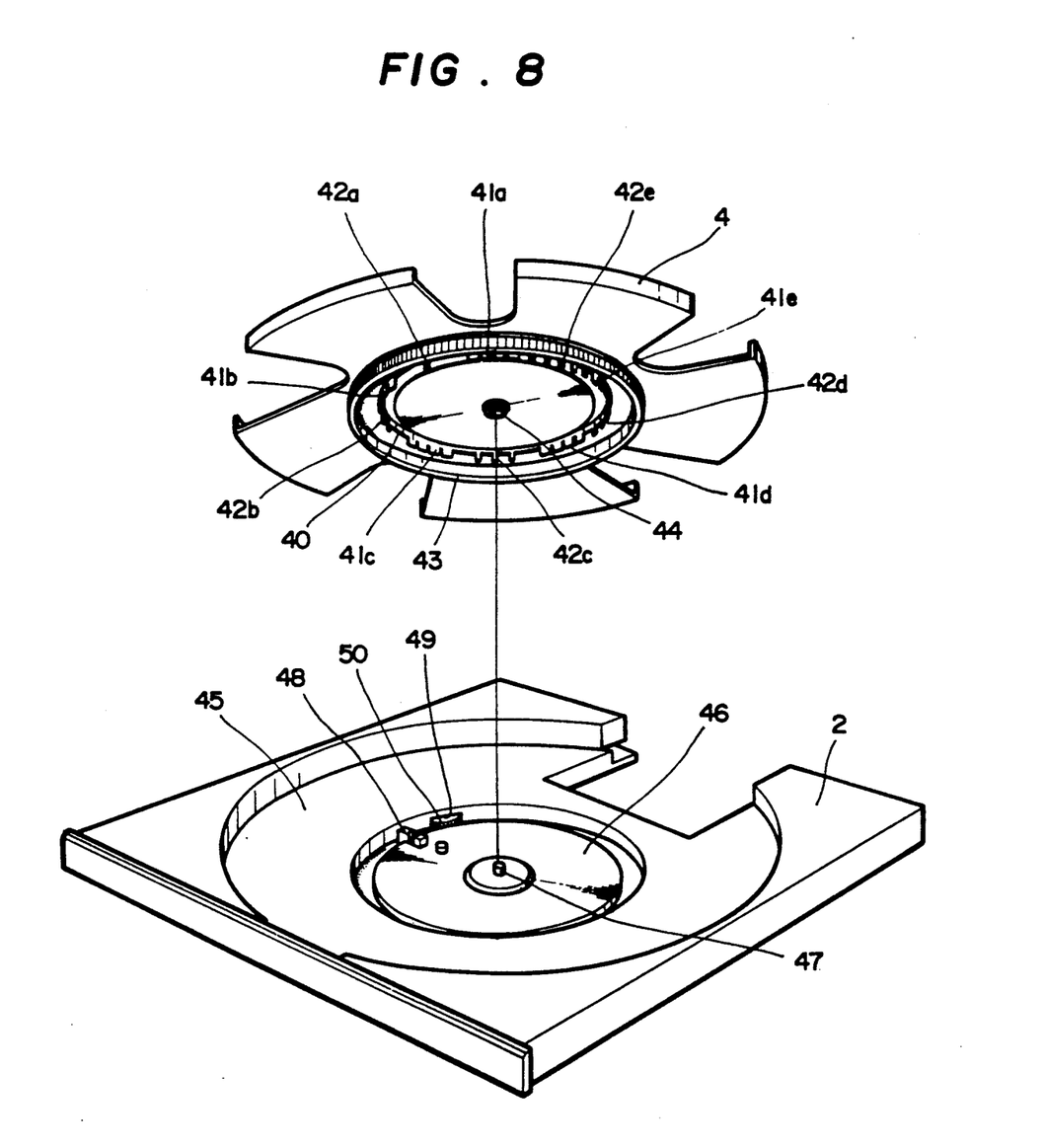
FIG. 8 is a perspective view showing the bottom structure of the roulette and the upper part structure of the tray.
Figure 9:
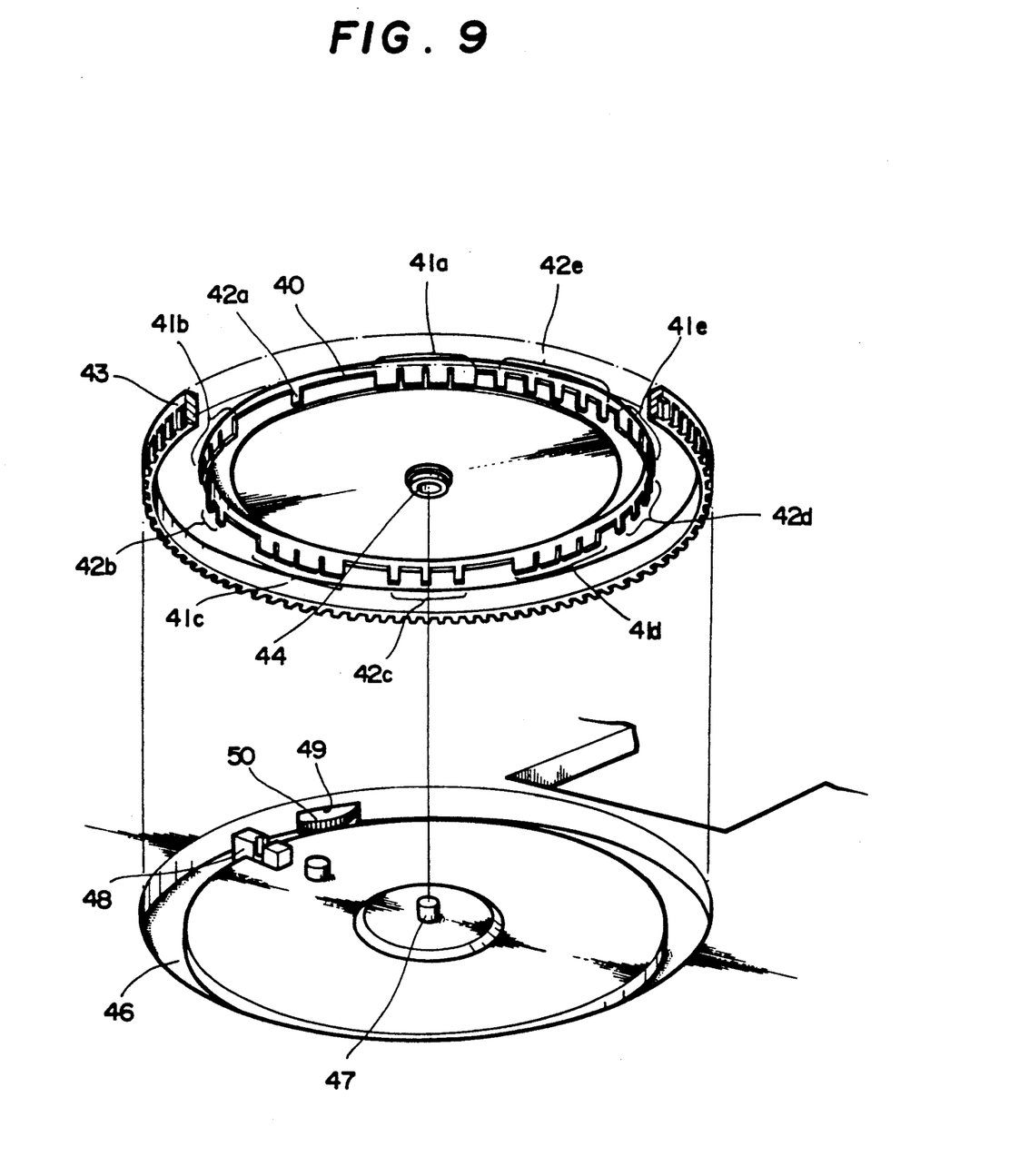
FIG. 9 is an enlarged view of the essential part shown in FIG. 8.

FIG. 8 is a perspective view showing the structure of the lower surface of the roulette 4 and the structure of the upper surface of the tray 2, and FIG. 9 is a partially enlarged perspective view of FIG. 8.

As shown from FIGS. 8 and 9, the ring-shaped protruded wall 40 is formed on the bottom of the roulette 4, and a plurality of protrusions are formed on the protruded wall. In detail, the plurality of protrusions are composed of five identical protrusion groups 41a to 41e, each of which is formed of identically shaped four protrusions, and one protrusion 42a, two protrusions 42b, three protrusions 42c, four protrusions 42d, and five protrusions 42e placed between the five protrusion groups, respectively. The five protrusion groups 41a to 41e are arranged with equal intervals on the ring-shaped protruded wall 40, i.e., with an angle of 72° between the two adjacent extruder groups, respectively. These protrusion groups 41a to 41e correspond to the five CD inserting portions on the roulette 4 and after a specific CD is selected, generate a signal for stopping the roulette 4 in cooperation with an optical signal scanning and sensing device described later.

The single protrusion 42a is disposed at the center between the protrusion groups 41a and 41b, and similarly the two protrusions 42b between the protrusion groups 41b and 41c, the three protrusions 42c between the protrusion groups 41c and 41d, the four protrusions 42d between the protrusion groups 41d and 41e, and the five protrusions 42e between the protrusion groups 41e and 41a, respectively. The one to five protrusions 42a to 42e distinguish the five CD inserting portions on the roulette 4 and generate the CD selecting signal upon passing through an optical signal scanning and sensing device described later during the rotation of the roulette 4.

Also, a ring-shaped rack 43 is formed on the outside of the ring-shaped protruded wall 40 formed on the bottom of the roulette 4, and is to be engaged with the pinion of the roulette rotation driving device. The rotating axis hole 44 is formed at the center of the roulette 4.

On the other hand, a first recess 45 on which the roulette 4 is disposed is formed on the upper surface of the tray 2, a second recess 46 for receiving the plurality of protrusions 41a to 41e and 42a to 42e and the ring-shaped rack 43 is formed at the center of the first recess 45, and the rotating axis 47 to be inserted into the rotating axis hole 44 of the roulette is protruded at the center of the second recess 46. An optical signal scanning and sensing device 48 is disposed adjacent to the rim of the second recess 46, and a notch 49 is formed on the outer wall surface. A pinion 50 of the roulette rotating device 6 is protruded from the notch 49, thereby being engaged with the sawteeth of the ring-shaped rack 43 formed on the bottom of the roulette 4.

As described above, the plurality of protrusions 41a to 41e, and 42a to 42e formed on the bottom of the roulette 4 pass through the optical signal scanning and sensing device 48 during the rotation of the roulette 4. At this time, if a certain CD selection switch (not shown) is pressed, the protrusion corresponding to a specific CD, among the one to five protrusions 42a to 42e, is detected by the optical signal scanning and sensing device 48, and the roulette is stopped with the specific CD aligned with the pickup in response to a stopping signal generated in cooperation with the five protrusion groups 41a to 41e and the optical signal scanning and sensing device 48, so that the specific CD is selected and played.

As described above, according to the present invention, in the front loading type CD changer which can load five CDs, the tray is maximally moved forward by a small-sized pinion drum, thereby being able to replace all of five CDs. After the retracting operation of the tray is completed, the tray is surely locked into the housing, so that it is impossible for the tray to be inadvertently drawn out. A CD double insertion preventing device for protecting the CD being in play is provided, sot that without being large-sized of the tray, when one CD is played, a new CD cannot be inserted in the CD inserting portion where the CD has been disposed. Also a desired CD among five CDs is selected by a single sensor and can be played.

While the invention has been particularly shown and described with reference to preferred embodiments thereof, it will be understood by those skilled in the art that any modification and other changes in form and details can be made therein without departing from the spirit and scope of the invention.

What is claimed is:

1. A front loading type compact disk changer which can load or replace a plurality of compact disks by drawing out a tray from a housing, comprising:

a tray feeding and locking pinion drum in which a pinion for feeding the tray to the outside and inside by being engaged with a rack formed on the lower surface of the tray has a semicircular wall part for locking the tray by being engaged to a stopper on the lower surface of the tray when the retracting operation of the tray is completed;

a CD double insertion preventing device composed of a fixed plate fixed on the upper inner surface of the housing and a rotating plate pivotably connected to the front of the fixed plate, for preventing a new CD from being inserted into a CD inserting portion when one of plural CDs is played; and a plurality of protrusions disposed in a single line on the lower surface of a roulette for generating a specific CD selecting signal and a roulette stopping signal in cooperation with a single sensor.

2. A CD changer as claimed in claim 1, comprising:

a rack formed on the lower surface of the tray and provided with a half-gear part and a non-gear part on an outside end;

a tray stopper formed adjacent to the half-gear part and the non-gear part formed on the lower surface of the tray; and a tray feeding and locking pinion drum which is to be engaged with said rack, comprising a first pinion driven by the power of a motor disposed on the inner surface of bottom of the housing, a second pinion formed on an upper portion of the first pinion and having a smaller diameter than that of the first pinion and provided with a half-gear part and a non-gear part on a part thereof, and a semicircular wall part formed on an upper portion of said second pinion, for being engaged with the stopper on the lower surface of said tray when the retracting operation of the tray is completed.

3. A CD changer as claimed in claim 1, wherein the CD double insertion preventing device comprises:

a fixed plate disposed on the upper inner surface of the housing and having arc-shaped guide slots; and a rotating plate which is pivotably connected to the front portion of said fixed plate, having guide pieces moved in a slide way along said arc-shaped guide slots, a forked arm with a guide path formed at its one side, and a semicircular cover of a little bit larger diameter than that of the CD diameter formed at its front part.

4. A CD changer as claimed in claim 1, wherein a means for generating a CD selecting signal and a roulette stopping signal comprising:

five first protrusion groups formed with equal intervals on a ring-shaped protruded wall formed on the lower surface of the roulette;

five second protrusion groups disposed between said five first protrusion groups, said five second protrusion groups each consisting of between one and five protrusions; and a single optical signal scanning and sensing device disposed on a second recess on the upper surface of the tray and through which said first and second protrusion groups are passed.

* * * * *